US011680814B2

(12) United States Patent
Drummond et al.

(10) Patent No.: US 11,680,814 B2
(45) Date of Patent: Jun. 20, 2023

(54) AUGMENTED REALITY-BASED TRANSLATIONS ASSOCIATED WITH TRAVEL

(71) Applicant: Snap Inc., Santa Monica, CA (US)

(72) Inventors: Virginia Drummond, Venice, CA (US); Jean Luo, Los Angeles, CA (US); Alek Matthiessen, Marina Del Rey, CA (US); Celia Nicole Mourkogiannis, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 132 days.

(21) Appl. No.: 17/155,819

(22) Filed: Jan. 22, 2021

(65) Prior Publication Data
US 2021/0404831 A1    Dec. 30, 2021

Related U.S. Application Data

(60) Provisional application No. 62/705,505, filed on Jun. 30, 2020.

(51) Int. Cl.
*G01C 21/36* (2006.01)
*G06V 20/20* (2022.01)
(Continued)

(52) U.S. Cl.
CPC ..... *G01C 21/3614* (2013.01); *G01C 21/3476* (2013.01); *G06F 3/017* (2013.01); *G06V 20/20* (2022.01)

(58) Field of Classification Search
CPC . G01C 21/3614; G01C 21/3476; G06F 3/017; G06F 40/58; G06V 20/20; G06T 11/00
See application file for complete search history.

(56) References Cited

U.S. PATENT DOCUMENTS 10,387,730 B1 *   8/2019   Cowburn .............. G06V 20/63
10,529,139 B1 *   1/2020   Greene ................. G06T 13/40
(Continued)

FOREIGN PATENT DOCUMENTS

WO   WO-2022005843 A1    1/2022

OTHER PUBLICATIONS

"International Application Serial No. PCT/US2021/038684, International Search Report dated Oct. 5, 2021", 4 pgs.
(Continued)

*Primary Examiner* — Grant Sitta
(74) *Attorney, Agent, or Firm* — Schwegman Lundberg & Woessner, P.A.

(57) ABSTRACT

Aspects of the present disclosure involve a system comprising a computer-readable storage medium storing a program and method for providing augmented reality content corresponding to a translation in association with travel. The program and method provide for receiving, by a messaging application running on a device of a user, a request to scan an image captured by a device camera; obtaining, in response to receiving the request, a travel parameter associated with the request, and an attribute of an object depicted in the image; determining, based on the travel parameter and the attribute, to perform a translation with respect to the object; performing, in response to the determining, the translation with respect to the object; and displaying an augmented reality content item, which includes the translation, with the image.

18 Claims, 12 Drawing Sheets

(51) Int. Cl.
*G01C 21/34* (2006.01)
*G06F 3/01* (2006.01)

(56) References Cited

U.S. PATENT DOCUMENTS

| | | | |
|---|---|---|---|
| 11,308,327 B2* | 4/2022 | Drummond | H04L 51/18 |
| 2009/0063129 A1* | 3/2009 | Tsai | G06V 30/142 |
| | | | 704/3 |
| 2015/0371407 A1 | 12/2015 | Kim et al. | |
| 2018/0052832 A1* | 2/2018 | Anglin | G06F 40/58 |
| 2018/0129276 A1 | 5/2018 | Nguyen et al. | |
| 2018/0253901 A1* | 9/2018 | Charlton | G06T 19/003 |
| 2018/0300916 A1* | 10/2018 | Barnett | G06T 11/00 |
| 2019/0379617 A1* | 12/2019 | Luo | H04L 51/234 |
| 2022/0179665 A1* | 6/2022 | Rathod | G06F 9/451 |

OTHER PUBLICATIONS

"International Application Serial No. PCT/US2021/038684, Written Opinion dated Oct. 5, 2021", 7 pgs.

* cited by examiner

AUGMENTED REALITY-BASED TRANSLATIONS ASSOCIATED WITH TRAVEL

CLAIM OF PRIORITY

This application claims the benefit of priority to U.S. Provisional Application Ser. No. 62/705,505, filed on Jun. 30, 2020, which is incorporated herein by reference in its entirety.

TECHNICAL FIELD

The present disclosure relates generally to a messaging system, including providing augmented reality content with a captured image.

BACKGROUND

Messaging systems provide for the exchange of message content between users. For example, a messaging system allows a user to exchange message content (e.g., text, images) with one or more other users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

A messaging system typically allow users to exchange content items (e.g., messages, images and/or video) with one another in a message thread. A messaging system may implement or otherwise work in conjunction with an augmentation system to augment media content associated with a message. For example, the augmentation system may combine overlays, filters and/or augmented reality content with image data captured by a device camera. However, a user may wish for facilitated creation and/or selection of augmented reality content when traveling.

The disclosed embodiments provide for presenting augmented reality content corresponding to a translation in association with travel. In response to a user request to perform a scan operation (e.g., to identify objects in a captured image), a messaging client determines both attribute(s) of an object depicted in the image, and travel parameters associated with the request. For example, the attribute(s) may correspond to the name of an object depicted in the image, and/or text depicted in the image. The travel parameters may indicate one or more of travel schedules, transportation schedules, languages, general locations, specific venues or landmarks, activities, participants and/or topics of interest.

Based on the travel parameter(s) and attribute(s), the messaging client may determine to perform a translation of text depicted in the image. For example, the captured image may include text (e.g., depicted in art, a magazine, a landmark, and the like) in a foreign language, and the travel parameters may indicate that the user is traveling in a particular region associated with the foreign language. Based on this determination, the messaging client provides for translating the text from the foreign language to a language known by the user (e.g., a primary language of the user). In addition, the messaging client displays an augmented reality content item (e.g., corresponding to an augmented reality experience), which includes the translated text, in association with the captured image.

Figure 1:
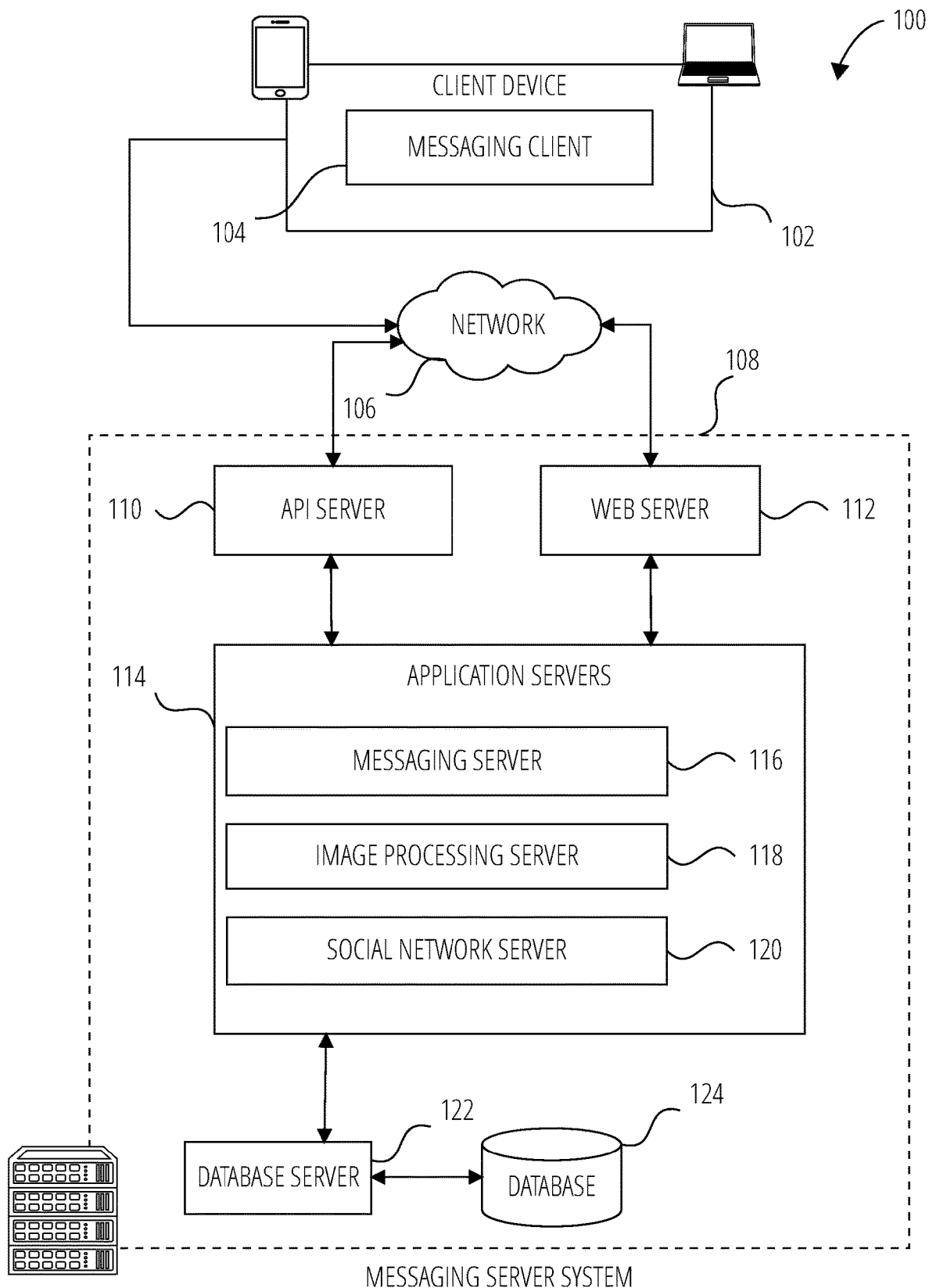
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 114. The application servers 114 are communicatively coupled to a database server 122, which facilitates access to a database 124 that stores data associated with messages processed by the application servers 114. Similarly, a web server 112 is coupled to the application servers 114, and provides web-based interfaces to the application servers 114. To this end, the web server 112 processes incoming network requests over the Hypertext Transfer Protocol (HTTP) and several other related protocols.

The Application Program Interface (API) server 110 receives and transmits message data (e.g., commands and message payloads) between the client device 102 and the application servers 114. Specifically, the Application Program Interface (API) server 110 provides a set of interfaces (e.g., routines and protocols) that can be called or queried by the messaging client 104 in order to invoke functionality of the application servers 114. The Application Program Interface (API) server 110 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 116, and for possible access by another messaging client 104, the settings of a collection of media data (e.g., Story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 116, an image processing server 118, and a social network server 120. The messaging server 116 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called Stories or galleries). These collections are then made available to the messaging client 104. Other processor and memory intensive processing of data may also be performed server-side by the messaging server 116, in view of the hardware requirements for such processing.

The application servers 114 also include an image processing server 118 that is dedicated to performing various image processing operations, typically with respect to images or video within the payload of a message sent from or received at the messaging server 116.

Figure 3:
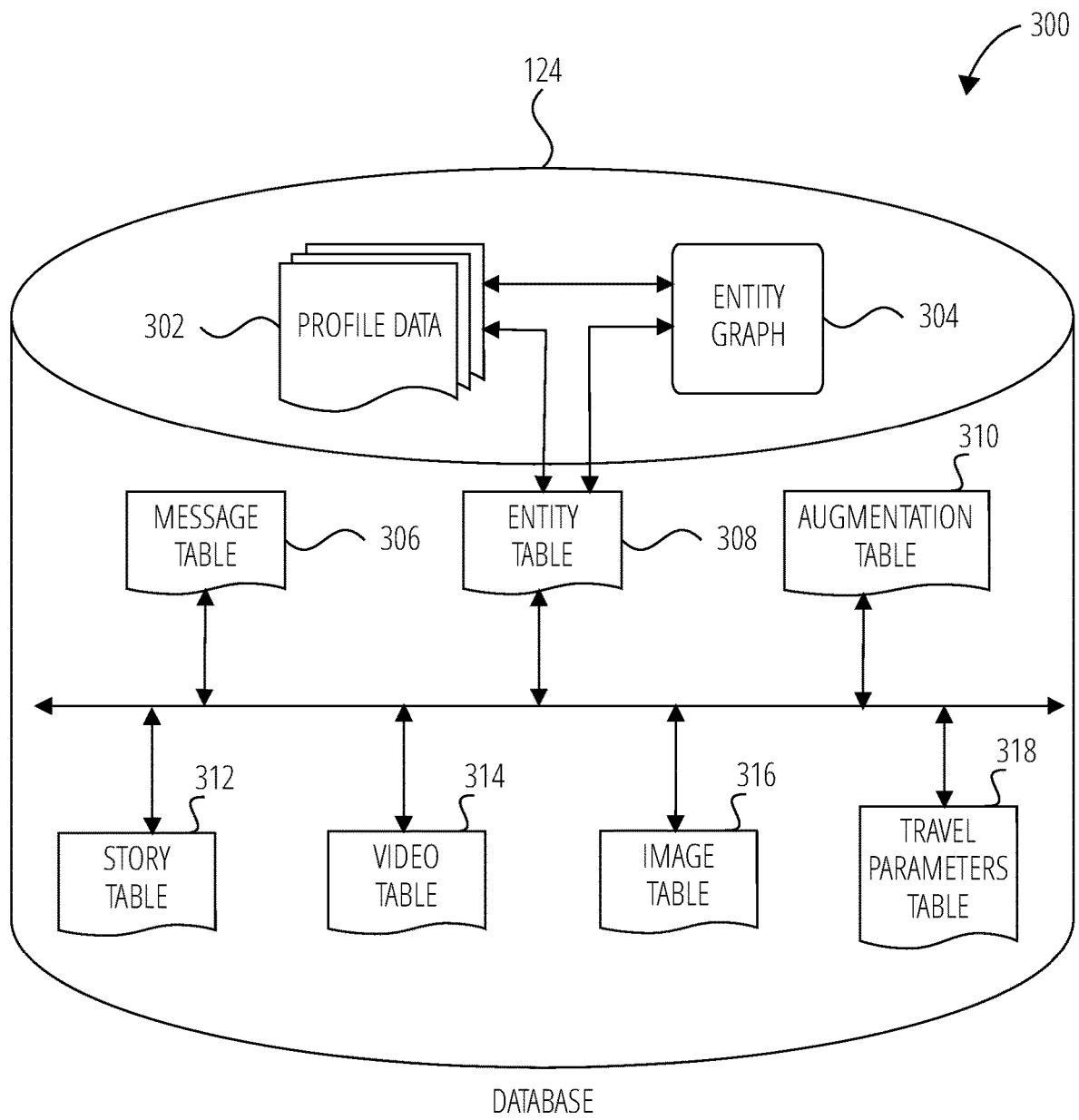
FIG. 3 is a diagrammatic representation of a data structure as maintained in a database, in accordance with some example embodiments.

The social network server 120 supports various social networking functions and services and makes these functions and services available to the messaging server 116. To this end, the social network server 120 maintains and accesses an entity graph 304 (as shown in FIG. 3) within the database 124. Examples of functions and services supported by the social network server 120 include the identification of other users of the messaging system 100 with which a particular user has relationships or is "following," and also the identification of other entities and interests of a particular user.

Figure 2:
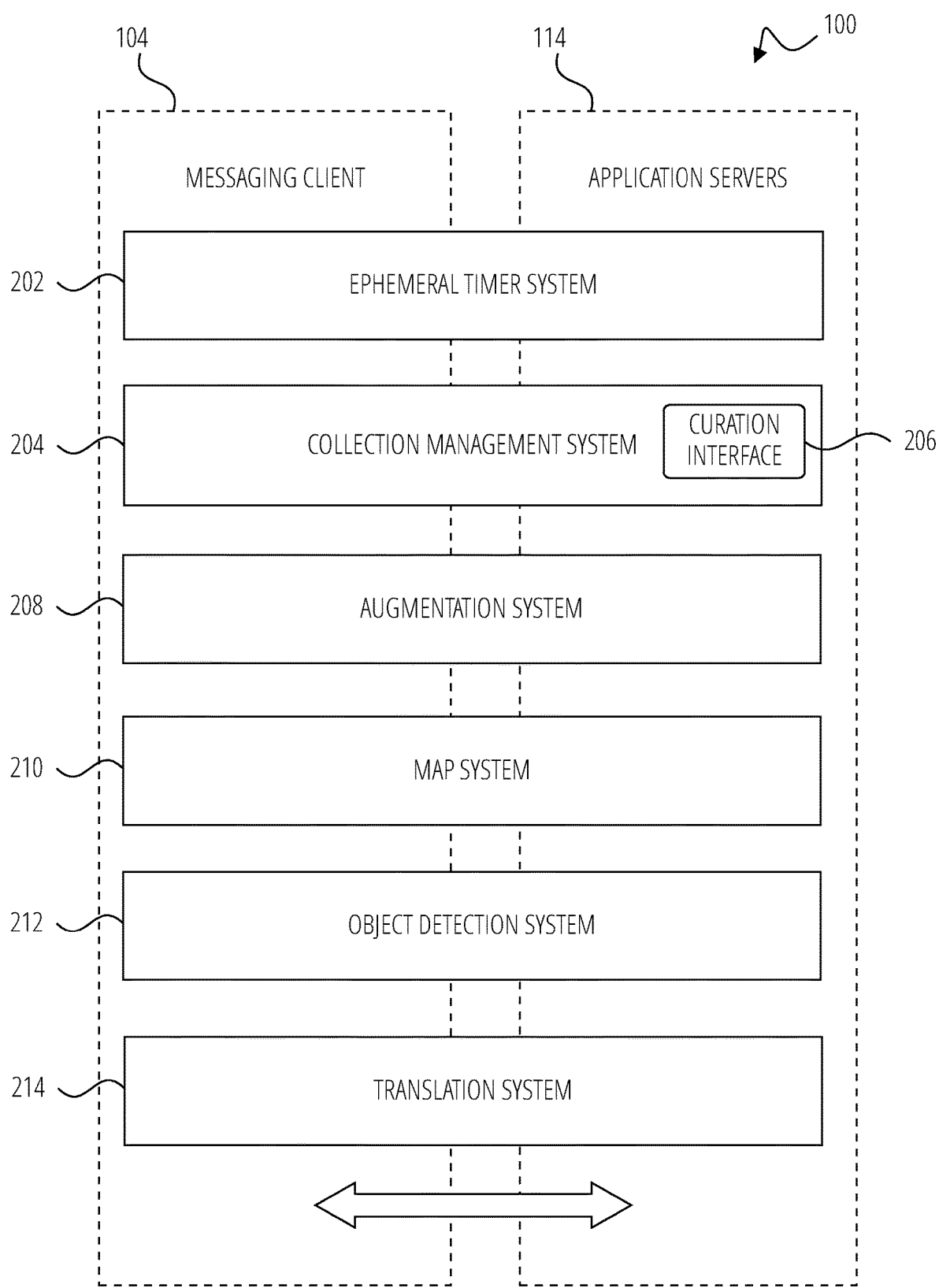
FIG. 2 is a diagrammatic representation of a messaging system that has both client-side and server-side functionality, in accordance with some example embodiments.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, an object detection system 212, and/or a translation system 214.

The ephemeral timer system 202 is responsible for enforcing the temporary or time-limited access to content by the messaging client 104 and the messaging server 116. The ephemeral timer system 202 incorporates a number of timers that, based on duration and display parameters associated with a message, or collection of messages (e.g., a Story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event Story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 124 and accessed through the database server 122.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions, and supports the presentation of map-based media content and messages by the messaging client 104. For example, the map system 210 enables the display of user icons or avatars (e.g., stored in association with profile data 302, discussed below) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate avatar status, as described herein) with other users of the messaging system 100 via the messaging client 104, with this location and status information being similarly displayed within the context of a map interface of the messaging client 104 to selected users.

The object detection system 212 provides various object detection functions within the context of the messaging system 100. The object detection system 212 may employ one or more object classifiers to identify objects depicted in a captured image. The image may correspond to a live video feed captured by a camera (e.g., rear or front facing camera) of the client device 102. Alternatively or in addition, the image may correspond to an image (e.g., photo) stored in association with the user of the client device 102 (e.g., a photo library).

In one or more embodiments, the object detection system 212 is configured to implement or otherwise access object recognition algorithms (e.g., including machine learning algorithms) configured to scan the captured image, and to detect/track the movement of objects within the image. By way of non-limiting example, detectable objects within an image include: a human face, parts of a human body, animals and parts thereof, landscapes, objects in nature, non-living objects (e.g., buildings, store fronts, food, articles of clothing, chairs, books, cars, buildings, other structures), illustrations of objects (e.g., on posters and/or flyers), text-based objects, equation-based objects and the like.

With respect to text, the object detection system 212 is configured to detect text depicted within a captured image. In addition, the object detection system 212 is configured to convert the depicted text into machine-encoded text, for example using, optical character recognition (OCR). For example, the machine-encoded text may be a single word (e.g., corresponding to a single name or term depicted within the image). In another example, the machine-encoded text may include multiple words terms (e.g., corresponding to a phrase, passage, list, page of text, and the like depicted within the image).

In addition, the object detection system 212 is configured to determine or otherwise access attributes of objects. For a particular object, the object detection system 212 may determine or retrieve attributes such as a name/type, genre, color, size, shape, texture, environmental factors (e.g., geolocation, time, weather), and/or other supplemental information (e.g., a song title/artist for an object corresponding to media). In one or more embodiments, the object detection system 212 may designate machine-encoded text (e.g., converted from depicted text via OCR) as an attribute.

With respect to the environmental factors, the object detection system 212 may receive information from the messaging client 104 to identify the weather, geographical location, time, and so forth around the client device 102 (e.g., via device sensors). The object detection system 212 may rank the retrieved attributes based on relevance, such as based on their association with the one or more environmental factors. Other machine learning techniques may be employed to select and rank retrieved attributes. The object detection system 212 may select an object from the list of objects detected in the captured image that is associated with the highest ranked attributes, and may send an indication of the selected object to the messaging client 104. Alternatively or in addition, the object detection system 212 may provide for communicating one or more attributes (e.g., name/type) for each detected object, and/or an indication of the ranking of the attributes to the messaging client 104.

In one or more embodiments, the object detection system 212 determines that one of the attributes corresponds to a keyword that has been sponsored by a third party. For example, third parties may sponsor or pay for certain keywords to be ranked higher than others. In response to determining that a given attribute corresponds to a sponsored keyword, the object detection system 212 may provide for a higher ranking of that attribute relative to other attributes.

The translation system 214 provides various functions relating to the translation of text. For example, the translation system 214 is configured to receive text (e.g., comprising a single word or multiple words) in a first language, to translate the text into a second requested language, and to provide the translated text as output. In one or more embodiments, the translation system 214 is configured to provide an indication of language(s) that are unavailable in response to a request.

Moreover, the translation system 214 may be configured to receive formatting information as part of a request, and to provide the translated text together with respective formatting information. In this manner, the translation system 214 may facilitate in maintaining the format of the original text (e.g., with respect to lists, fonts, styles, and the like) when providing a translation.

FIG. 3 is a schematic diagram illustrating data structures 300, which may be stored in the database 124 of the messaging server system 108, according to certain examples. While the content of the database 124 is shown to comprise a number of tables, it will be appreciated that the data could be stored in other types of data structures (e.g., as an object-oriented database).

The database 124 includes message data stored within a message table 306. This message data includes, for any particular one message, at least message sender data, message recipient (or receiver) data, and a payload. Further details regarding information that may be included in a message, and included within the message data stored in the message table 306 is described below with reference to FIG. 4.

An entity table 308 stores entity data, and is linked (e.g., referentially) to an entity graph 304 and profile data 302. Entities for which records are maintained within the entity table 308 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 304 stores information regarding relationships and associations between entities. Such relationships may be social, professional (e.g., work at a common corporation or organization) interest-based or activity-based, merely for example.

The profile data 302 stores multiple types of profile data about a particular entity. The profile data 302 may be selectively used and presented to other users of the messaging system 100, based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations), if any. A particular user may then selectively include one or more of these avatar representations within the content of messages communicated via the messaging system 100, and on map interfaces displayed by messaging clients 104 to other users.

Where the entity is a group, the profile data 302 for the group may similarly include one or more avatar representations associated with the group, in addition to the group name, members, and various settings (e.g., notifications) for the relevant group.

The database 124 further includes a travel parameters table 318 for storing respective travel parameters for users. While the travel parameters table 318 is depicted as separate from the profile data 302, it is possible for the travel parameters table 318 to be included as part of the profile data 302. Thus, each entity/user may have respective travel parameters associated therewith. Examples of travel parameters include, but are not limited to: travel schedules, transportation schedules, languages, general locations, specific venues or landmarks, activities, participants (e.g., friends who are participating in all or part of the traveling) and/or topics of interest.

The messaging system 100 may populate the travel parameters table 318 based on user-submitted content provided within the messaging client 104 (e.g., content within message threads, and/or in association with travel-planning user interfaces provided by the messaging system 100). Alternatively or in addition, the messaging system 100 may populate the database 124 based on content from third-party applications (e.g., content from third-party email/text message applications, calendar applications, flight applications, hotel applications, etc.). In one or more embodiments, a user may opt-in and/or otherwise authorize populating the travel parameters table 318 with content from within the messaging system 100 and/or from third-party applications.

The database 124 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape.

Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on the client device 102 and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a Story or a gallery). The creation of a particular collection may be initiated by a particular user (e.g., each user for which a record is maintained in the entity table 308). A user may create a "personal Story" in the form of a collection of content that has been created and sent/broadcast by that user. To this end, the user interface of the messaging client 104 may include an icon that is user-selectable to enable a sending user to add specific content to his or her personal Story.

A collection may also constitute a "live Story," which is a collection of content from multiple users that is created manually, automatically, or using a combination of manual and automatic techniques. For example, a "live Story" may constitute a curated stream of user-submitted content from varies locations and events. Users whose client devices have location services enabled and are at a common location event at a particular time may, for example, be presented with an option, via a user interface of the messaging client 104, to contribute content to a particular live Story. The live Story may be identified to the user by the messaging client 104, based on his or her location. The end result is a "live Story" told from a community perspective.

A further type of content collection is known as a "location Story," which enables a user whose client device 102 is located within a specific geographic location (e.g., on a college or university campus) to contribute to a particular collection. In some examples, a contribution to a location Story may require a second degree of authentication to verify that the end user belongs to a specific organization or other entity (e.g., is a student on the university campus).

As mentioned above, the video table 314 stores video data that, in one example, is associated with messages for which records are maintained within the message table 306. Similarly, the image table 316 stores image data associated with messages for which message data is stored in the entity table 308. The entity table 308 may associate various augmentations from the augmentation table 310 with various images and videos stored in the image table 316 and the video table 314.

Figure 4:
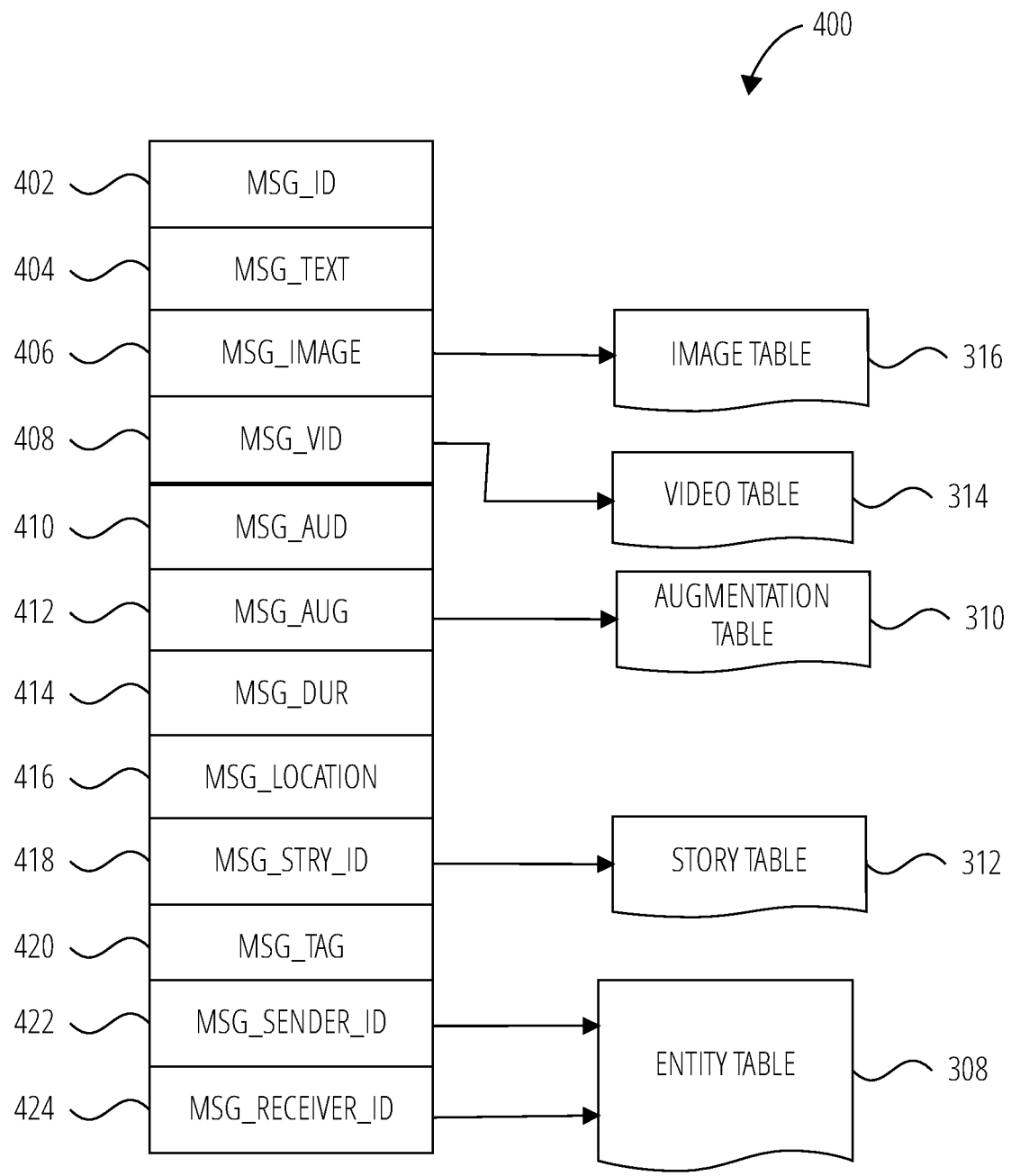
FIG. 4 is a diagrammatic representation of a message, in accordance with some example embodiments.

FIG. 4 is a schematic diagram illustrating a structure of a message 400, according to some examples, generated by a messaging client 104 for communication to a further messaging client 104 or the messaging server 116. The content of a particular message 400 is used to populate the message table 306 stored within the database 124, accessible by the messaging server 116. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 316.

message video payload 408: video data, captured by a camera component or retrieved from a memory component of the client device 102, and that is included in the message 400. Video data for a sent or received message 400 may be stored in the video table 314.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "Stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 308.

Figure 5:
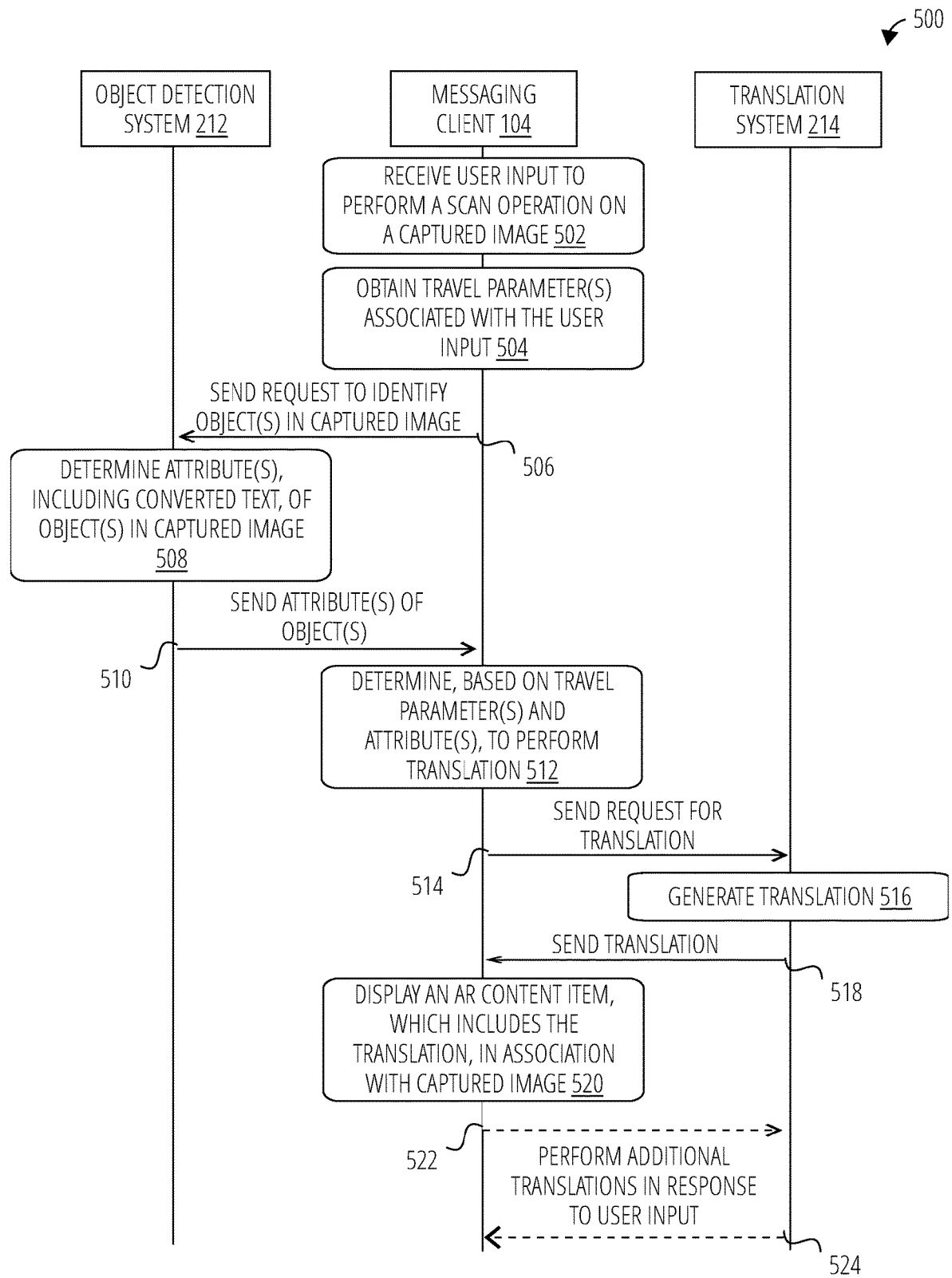
FIG. 5 is an interaction diagram illustrating a process for providing augmented reality content corresponding to a translation in association with travel, in accordance with some example embodiments.

FIG. 5 is an interaction diagram illustrating a process 500 for providing augmented reality content corresponding to a translation in association with travel, in accordance with some example embodiments. For explanatory purposes, the process 500 is primarily described herein with reference to the messaging client 104 of FIG. 1, and the object detection system 212 and the translation system 214 of FIG. 2. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

The messaging client 104 may be associated with a respective user of the messaging server system 108, and the user may be associated with a user account of the messaging server system 108. As noted above, the user may be identified by the messaging server system 108 based on a unique identifier (e.g., a messaging system identifier, email address and/or a device identifier) associated with the user account for that user. In addition, the messaging server system 108 may implement and/or work in conjunction with the social network server 120 which is configured to identify other users (e.g., friends) with which a particular user has relationships.

As described herein, the messaging client 104 (e.g., in conjunction with the messaging server system 108) receives a user request to perform a scan operation (e.g., to identify objects in a captured image). The messaging client 104 determines both attribute(s) of an object depicted in the image, and travel parameters associated with the request. For example, the attribute(s) may correspond to the name of an object depicted in the image, and/or text depicted in the image. The travel parameters may indicate one or more of travel schedules, transportation schedules, languages, general locations, specific venues or landmarks, activities, participants and/or topics of interest. Based on the travel parameter(s) and attribute(s), the messaging client 104 determines to perform a translation of text depicted in the image. Based on this determination, the messaging client 104 provides for translating the text from the foreign language to a language known by the user. In addition, the messaging client 104 displays an augmented reality content item (e.g., corresponding to an augmented reality experience), which includes the translated text, in association with the captured image.

At block 502, the messaging client 104 receives user input to perform a scan operation on a captured image. As described herein, performing a scan operation corresponds with identifying objects depicted in the captured image. In one or more embodiments, the messaging client 104 activates the camera of the client device 102 (e.g., upon startup of the messaging client 104). The messaging client 104 allows a user to request to scan one or more items in a camera feed captured by the camera. In one or more embodiments, the messaging client 104 detects physical contact between a finger of the user's hand and a region of the touch screen for a threshold period of time (e.g., corresponding to a press-and-hold gesture). For example, the messaging client 104 determines that the user touched and held their finger on the screen for a threshold time (e.g., two seconds).

In an alternative embodiment, the press-and-hold gesture may be performed in association with a carousel interface (e.g., which is separate from a startup interface, as discussed below with respect to FIGS. 6A-6B). Within the carousel interface, an augmented reality content item, for modifying a captured image to include augmented reality content, may already be selected prior to receiving the user input. With respect to the press-and-hold gesture, the augmented reality content item may in some embodiments include a scan prompt which prompts the user for input to perform the scan operation. For example, the scan prompt may include text (e.g., "press and hold to scan") prompting the user for the press-and-hold gesture within a graphical boundary defining a predefined screen region.

As an alternative to the press-and-hold gesture, the messaging client 104 may receive user selection of a dedicated scan option (e.g., a scan button) presented together with the camera feed. Thus, in response to a user request to perform a scan operation, the messaging client 104 processes the captured image (e.g., a live video feed) to identify object(s) in the image. It is also possible for the captured image to correspond with an image/video stored in association with the user of the client device 102, for example, within a photo library (e.g., associated with an operating system of the client device 102 and/or associated with a user profile with respect to the messaging system 100).

At block 504, the messaging client 104 obtains a travel parameter associated with the user input. As noted above with respect to the travel parameters table 318, the messaging client 104 in conjunction with the messaging system 100 may be configured to access (e.g., based on appropriate user permissions) data relating to travel by the user, and to populate the travel parameters table 318 accordingly. The travel parameters table 318 may store travel parameters corresponding to user-submitted content provided within the messaging client 104 (e.g., content within message threads, and/or in association with travel-planning user interfaces provided by the messaging system 100). In another example, the travel parameters table 318 may store travel parameters corresponding to content from third-party applications (e.g., content from email/text messages, a calendar application, a flight application, a hotel application). In one or more embodiments, the travel parameters indicate one or more of: travel schedule(s), transportation schedule(s), language(s), general location(s) (e.g., cities, states, etc.), specific venues or landmarks, activities, participants (e.g., friends) and/or topics of interest.

At operation 506, the messaging client 104 sends, to the object detection system 212, a request to identify objects in the captured image (operation 506). The request may include the image data itself (e.g., if being captured in real time and/or stored locally on the client device 102). Alternatively, the request may reference a remote image (e.g., if stored in association with a user profile with respect to the messaging system 100).

In response to the request, the object detection system 212 determines attribute(s), including converted text, of object(s) in the captured image (block 508). As noted above, the object detection system 212 may correspond to a subsystem of the messaging system 100, and may be supported on the client side by the messaging client 104 and/or on the server side by the application servers 114. In one or more embodiments, the detection of object(s) within a captured image may be implemented client side, server side and/or a combination of client side and server side.

As further noted above, the object detection system 212 is configured to implement or otherwise access object recognition algorithms (e.g., including machine learning algorithms) configured to scan a captured image, and to detect/track the movement of objects within the image. For example, the object detection system 212 may detect object(s) in the captured image that relate to travel (e.g., a landmark, a piece of art, a product for sale at a particular venue, etc.). In another example, the object detection system 212 may detect an object in the image corresponding to a barcode (e.g., a Universal Product Code (UPC) code, QR code, or the like). In yet another example, as noted above, the object detection system 212 is configured to convert text depicted in a captured image into machine-encoded text using OCR. The machine-encoded text may be a single word or multiple words. In one or more embodiments, the object detection system 212 is configured to detect and process a combination of object(s), barcode(s) and/or text depicted in a captured image (e.g., relating to travel).

The object detection system 212 is further configured to determine or otherwise access attributes of the identified objects. For example, with respect to objects associated with user travel, the object detection system 212 may determine attributes such as a name of the object (e.g., a name of a book, mural, other piece of art, venue, landmark and the like), and other general information (e.g., physical attributes, associated dates, associated business names, authors, etc.). As noted above, the object detection system 212 may determine attribute(s) corresponding to a keyword that has been sponsored by a third party. For example, a third party (e.g., associated with a museum, venue or other business) may sponsor or pay for certain keywords (e.g., names of murals or other art pieces, names of publications such as magazines) to be ranked higher than others. In response to determining that a given attribute corresponds to a sponsored keyword, the object detection system 212 may provide for a higher ranking of that attribute relative to other attributes.

In one or more embodiments, the object detection system 212 may designate machine-encoded text (e.g., converted from depicted text via OCR) as an attribute of an object. Moreover, the object detection system 212 may determine a language of the text, and designate the language as an attribute for a depicted object (e.g., a magazine).

The object detection system 212 sends, to the messaging client 104, the attribute(s) of the object(s) (e.g., including machine-encoded text) to the messaging client 104 (operation 510). In doing so, the object detection system 212 may further provide ranking information of the attribute(s).

At block 512, the messaging client 104 determines, based on the attribute(s) and travel parameter(s), to perform a translation with respect to the object. For example, the messaging client 104 determines that the attribute(s) of the object (e.g., name of the object, language of depicted text as determined by a query to the translation system 214) and/or environmental factors (e.g., device geolocation and time) correspond with one or more of the travel parameters. Such correspondence may be based on matching (e.g., meeting a threshold comparison value with respect to) languages, object names, time periods, locations, topics and/or activities of the object attribute(s)/environmental factors with those of the travel parameters.

Based on the determination at block 512, the messaging client 104 sends a translation request to the translation system 214 (operation 514). As noted above, the translation system 214 may correspond to a subsystem of the messaging system 100, and may be supported on the client side by the messaging client 104 and/or on the server side by the application servers 114. In one or more embodiments, translation of text via the translation system 214 may be implemented client side, server side and/or a combination of client side and server side.

In a case where the captured image does not include depicted text, the translation request may be to provide the name of an object (e.g., a tomato) depicted in the image in two languages. The first language may be the language associated with travel, and the second language may be a known language of the user (e.g., a primary language of the user, for example, as stored in association with a user profile in the profile data 302). Alternatively or in addition, in a case where the captured image includes depicted text, the translation request may be to translate the depicted text from a foreign language to a known language of the user. Thus, the translation request provided by the messaging client 104 at operation 514 may include the text to be translated (e.g., an object name and/or machine-encoded text), and indications of the language of the provided text and the known language of the user.

As noted above, the translation system 214 is configured to receive text in the first language, to translate the text into the second requested language, to generate the translation, and to provide the translation as output. The translation system 214 is further configured to provide an indication of language(s) that are unavailable in response to a request. In addition, the translation system 214 is configured to maintain formatting of the translated text, for example, based on formatting information provided as part of the translation request. Thus, in response to the translation request sent in association with operation 514, the translation system 214 generates the translation (block 516). The translation system 214 then provides the translation to the messaging client 104 (operation 518).

As noted above with respect to block 502, the user input to perform the scan operation may have been received within a carousel interface, with an augmented reality content item already having been selected. Alternatively, the user input may have been received upon startup of the messaging client 104 (e.g., within a startup interface), in which case an augmented reality content item had not yet been selected.

In a case where an augmented reality content item had not been selected, the augmentation system 208 may provide for selecting an augmented reality content item. In one or more embodiments, the translation system 214 may correspond to a subsystem of the augmentation system 208. Thus, while the example of FIG. 5 depicts operations 514-518 as occurring between the messaging client 104 and the translation system 214, it is possible that these operations are performed (at least in part) between the messaging client 104 and the augmentation system 208. For example, the augmentation system 208 may itself be configured to perform the translation (e.g., with formatting). Alternatively or in addition, the translation system 214 may be a system which is separate from the augmentation system 208. For example, the messaging client 104 and/or the augmentation system 208 may communicate with the translation system 214 in order to obtain the translation (e.g., with formatting).

In one or more embodiments, the translation generated at block 516 and sent at operation 518 may correspond to a data structure with the translated text and formatting information. The data structure is usable by a given augmented reality content item to generate augmented reality content which includes the translation. In this manner, the augmented reality content item may correspond to a template with placeholders for the translated text. Alternatively or in addition, the translation generated at block 516 and sent at operation 518 may be generated by the augmented reality content item, which is selected among plural augmented reality content items stored in the augmentation table 310.

Following operation 518, the messaging client 104 displays the augmented reality content item, which includes the translation, together with the captured image (block 520). As discussed with respect to FIGS. 6A-6B, FIG. 7 and FIGS. 8A-8B below, the augmented reality content item may be configured to modify the captured image with augmented reality content (e.g., overlays, visual effects, and the like) that includes the translation provided by the translation system 214.

Moreover, the translation system 214 is configured to continue interaction with the messaging client 104. In one or more embodiments, the messaging client 104 may be configured to receive additional user input for generating a second translation, of the original machine-encoded text, to a different language. For example, the user profile stored within the profile data 302 may indicate one or more secondary languages known by the user. The messaging client 104 may be configured to receive user input requesting the second translation, for example, via a tilt gesture of the client device 102.

In response to receiving the user input (e.g., the tilt gesture), the messaging client 104 may send a request for the second translation. The request may include the original text (e.g., name of the object and/or machine-encoded text) and may indicate the requested language (e.g., secondary language) for the translation output. The messaging client 104 may be further be configured to re-display the first translation in response to a second tilt gesture of the client device 102 (e.g., opposite the direction of the first tilt gesture), and to switch between displaying the first and second translations (e.g., which may be temporarily stored in device memory) in response to subsequent respective tilt gestures. In the example of FIG. 5, operation 522 and operation 524 are shown in dashed lines to illustrate an optional translation performed with respect to a tilt gesture received by the messaging client 104.

Thus, the messaging client 104, in conjunction with the messaging server system 108, provides for providing augmented reality content with a captured image. The selection of the augmented reality content and a corresponding translation is based on attribute(s) of objects detected in the image, as well as travel parameters associated with an account of the user.

Figure 6A:
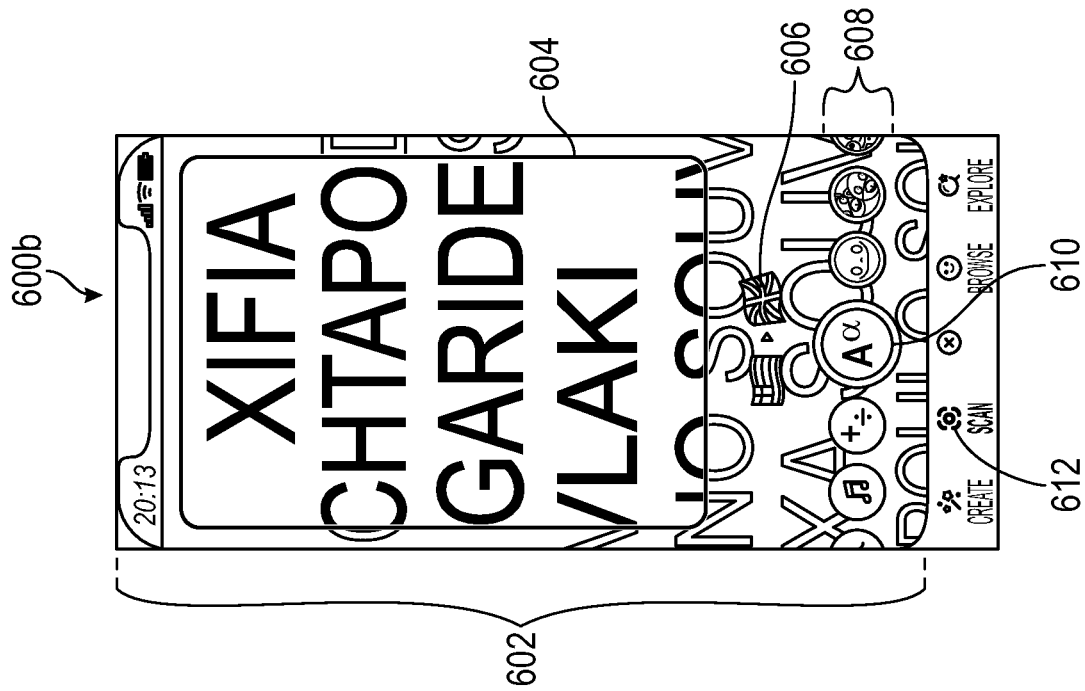
FIG. 6A illustrates an example user interface in which a user requests to display augmented reality corresponding to a translation in association with travel, in accordance with some example embodiments.

FIG. 6A illustrates an example user interface 600a in which a user requests to display augmented reality corresponding to a translation in association with travel, in accordance with some example embodiments. The user interface 600a includes a captured image 602, a scan prompt 604, a translation language indicator 606, a carousel interface 608 a selected AR icon 610 and a scan button 612.

In one or more embodiments, a user of the client device 102 provides touch input within the messaging client 104, to perform a scan operation to identify objects in the captured image 602 (e.g., a live video feed from a rear-facing camera). In the example of FIG. 6A, the touch input (e.g., a press- and hold gesture) is received by the messaging client 104 in association with a scan prompt 604 which defines a graphical boundary on the device screen. As noted above, the scan prompt 604 may be provided by an augmented reality content item associated with the selected AR icon 610. However, the touch input may instead correspond with user selection of a dedicated button (e.g., the scan button 612). In an alternative embodiment, the user may have selected an interface element (e.g., an image selection button) to perform a scan on a photo/video selected from a photo library (e.g., stored locally on the client device 102 or stored remotely in association with a user account of the messaging system 100). As shown in FIG. 6A, the captured image 602 depicts text in a first language (e.g., text from a magazine, other publication, mural, other piece of art, landmark, etc.).

In one or more embodiments, during the scan operation, the messaging client 104 is configured to display a scanning graphic (not shown) to indicate that the messaging client 104 is performing the scan operation. For example, the scanning graphic corresponds to an animation that is displayed for the duration of the scan (e.g., a predetermined duration of 2 seconds).

In response to receiving the touch input, the messaging client 104 (e.g., in conjunction with the object detection system 212) is configured to detect objects in the captured image 602, and to determine attribute(s) of the detected objects. In the example of FIG. 6A, the object detection system 212 determines an attribute corresponding to a machine-encoded version of the text depicted in the captured image 602. In addition, the object detection system 212 may be configured to determine a language associated with the machine-encoded version of the text (e.g., based on one or more of a query to the translation system 214, device geolocation and/or other parameters).

In addition, the messaging client 104 determines travel parameters associated with the touch input (e.g., one or more of a language, travel schedule, a transportation schedule, a general location, a specific venue or landmark, an activity, a list of participants, or a topic of interest). In one or more embodiments, the messaging client 104 determines that the attribute(s) of the machine-encoded text (e.g., and/or language) correspond with one or more of the travel parameters (e.g., language, general location). In response, the messaging client 104 may determine to perform a translation of the machine-encoded text from the first language to a second language (e.g., a primary language associated with the user's profile), and request the translation system 214 to perform such translation as discussed with respect to FIG. 6B below. In one or more embodiments, the translation language indicator 606 indicates the first language and the second language (e.g., via respective flags of the countries associated with the first and second languages).

In one or more embodiments, the user interface 600a includes the carousel interface 608 which allows the user to cycle through and/or select different augmented reality content items to apply/display with respect to the captured image 602. Each of the available augmented reality content items is represented by an icon which is user-selectable for switching to the respective augmented reality content item. In one or more embodiments, the icon corresponding to an active augmented reality content item (e.g., a selected AR icon 610) is displayed in a different manner relative to (e.g., larger than) the remaining icons. In response to user selection of the selected AR icon 610, the messaging client 104 provides for generating a media content item which includes an image (e.g., in response to a press/tap gesture of the selected AR icon 610) and/or a video (e.g., in response to a press-and-hold gesture of the selected AR icon 610) of the screen content, for example, to send to friends, include in a Story, and the like.

Figure 6B:
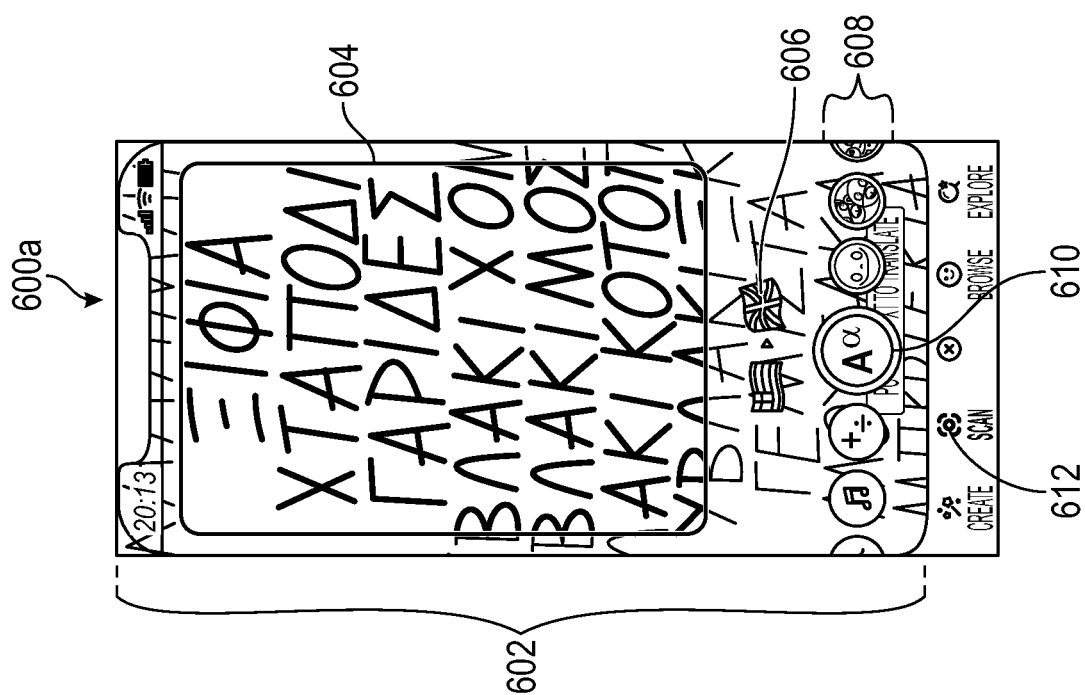
FIG. 6B illustrates an example user interface for displaying augmented reality corresponding to a translation in association with travel, in accordance with some example embodiments.

FIG. 6B illustrates an example user interface 600b for displaying augmented reality corresponding to a translation in association with travel, in accordance with some example embodiments. The user interface 600b depicts the captured image 602, the scan prompt 604, the translation language indicator 606, the carousel interface 608, the selected AR icon 610 and the scan button 612 of FIG. 6A.

In the example of FIG. 6B, the user interface 600b illustrates the translation, for example, as generated by the translation system 214. As noted above with respect to FIG. 6A, the translation system 214 may have performed such translation based on a request from the messaging client 104, and provided the translation to the messaging client 104.

In one or more embodiments, the generated translation is presented as an overlay with respect to the captured image 602. Alternatively or in addition, the generated translation is presented so as to replace the depicted text, and to be formatted in a manner which is consistent with the depicted text.

Figure 7:
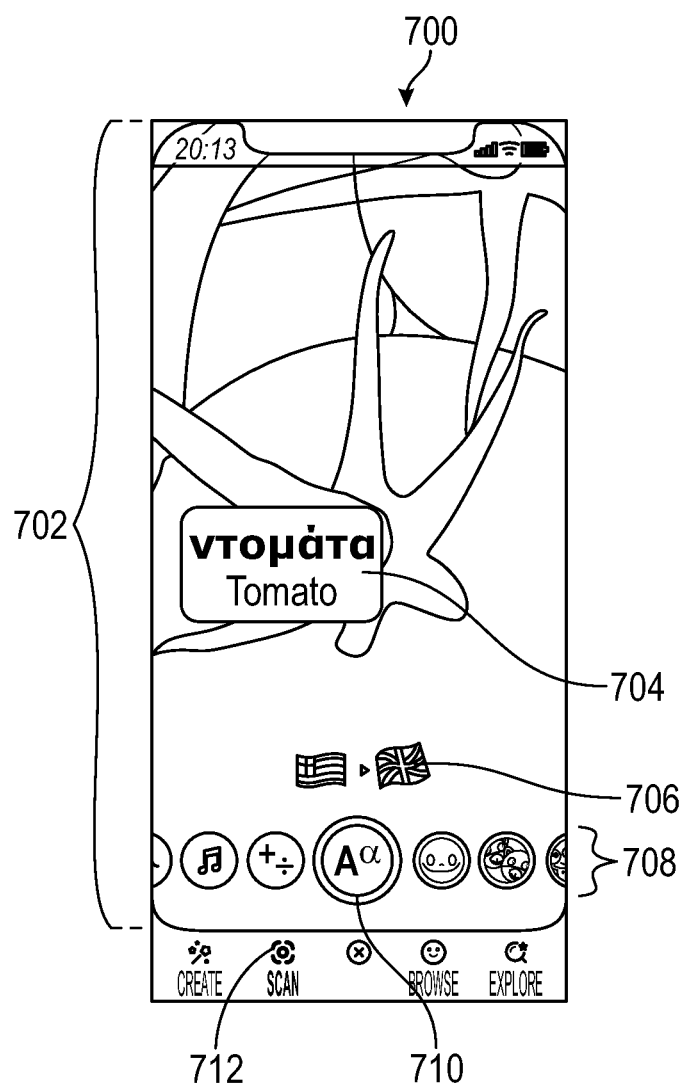
FIG. 7 illustrates an example user interface providing augmented reality content corresponding to a translation in association with travel, in accordance with some example embodiments.

FIG. 7 illustrates an example user interface 700 providing augmented reality content corresponding to a translation in association with travel, in accordance with some example embodiments. The user interface 700 includes a captured image 702, a translated name 704, a translation language indicator 706, a translation language indicator 706, a carousel interface 708, a selected AR icon 710 and a scan button 712.

In one or more embodiments, a user of the client device 102 provides touch input within the messaging client 104, to perform a scan operation to identify objects in the captured image 702 (e.g., a live video feed from a rear-facing camera). In the example of FIG. 7, the touch input (e.g., a press- and hold gesture) is received by the messaging client 104. However, the touch input may instead correspond with user selection of a dedicated button (e.g., the scan button 712). In an alternative embodiment, the user may have selected an interface element (e.g., an image selection button) to perform a scan on a photo/video selected from a photo library (e.g., stored locally on the client device 102 or stored remotely in association with a user account of the messaging system 100). As shown in FIG. 7, the captured image 602 depicts an object (e.g., a tomato) and does not depict text.

In one or more embodiments, during the scan operation, the messaging client 104 is configured to display a scanning graphic (not shown) to indicate that the messaging client 104 is performing the scan operation. For example, the scanning graphic corresponds to an animation that is displayed for the duration of the scan (e.g., a predetermined duration of 2 seconds).

In response to receiving the touch input, the messaging client 104 (e.g., in conjunction with the object detection system 212) is configured to detect objects in the captured image 602, and to determine attribute(s) of the detected objects. In the example of FIG. 7, the object detection system 212 determines an attribute corresponding to a name of the depicted object (e.g., the name "tomato"). In addition, the object detection system 212 may be configured to determine a language associated with the object (e.g., based on device geolocation and/or other parameters).

In addition, the messaging client 104 determines travel parameters associated with the touch input (e.g., one or more of a language, travel schedule, a transportation schedule, a general location, a specific venue or landmark, an activity, a list of participants, or a topic of interest). In one or more embodiments, the messaging client 104 determines that the attribute(s) of the object (e.g., the name and/or language) correspond with one or more of the travel parameters (e.g., language, general location). In response, the messaging client 104 may determine to perform a translation of the name of the object from the known language of the user (e.g., a first language) to a second language (e.g., the language corresponding to the travel parameters and/or device geolocation). The messaging client 104 may further request the translation system 214 to perform such translation.

In the example of FIG. 7, the user interface 700 illustrates the translated name 704, for example, as generated by the translation system 214 in response to the request from the messaging client 104. The translated name 704 may include both the first and the second languages. In addition, the translation language indicator 606 indicates the first language and the second language (e.g., via respective flags of the countries associated with the first and second languages). In one or more embodiments, the translated name 704 is presented as an overlay with respect to the captured image 702.

Similar to the carousel interface 608 of FIG. 6A, the carousel interface 708 of FIG. 7 allows the user to cycle through and/or select different augmented reality content items to apply/display with respect to the captured image 702. In addition, the icon corresponding to an active augmented reality content item (e.g., the selected AR icon 710) is user-selectable to generate a media content item which includes an image (e.g., in response to a press/tap gesture) and/or a video (e.g., in response to a press-and-hold gesture).

Figure 8:
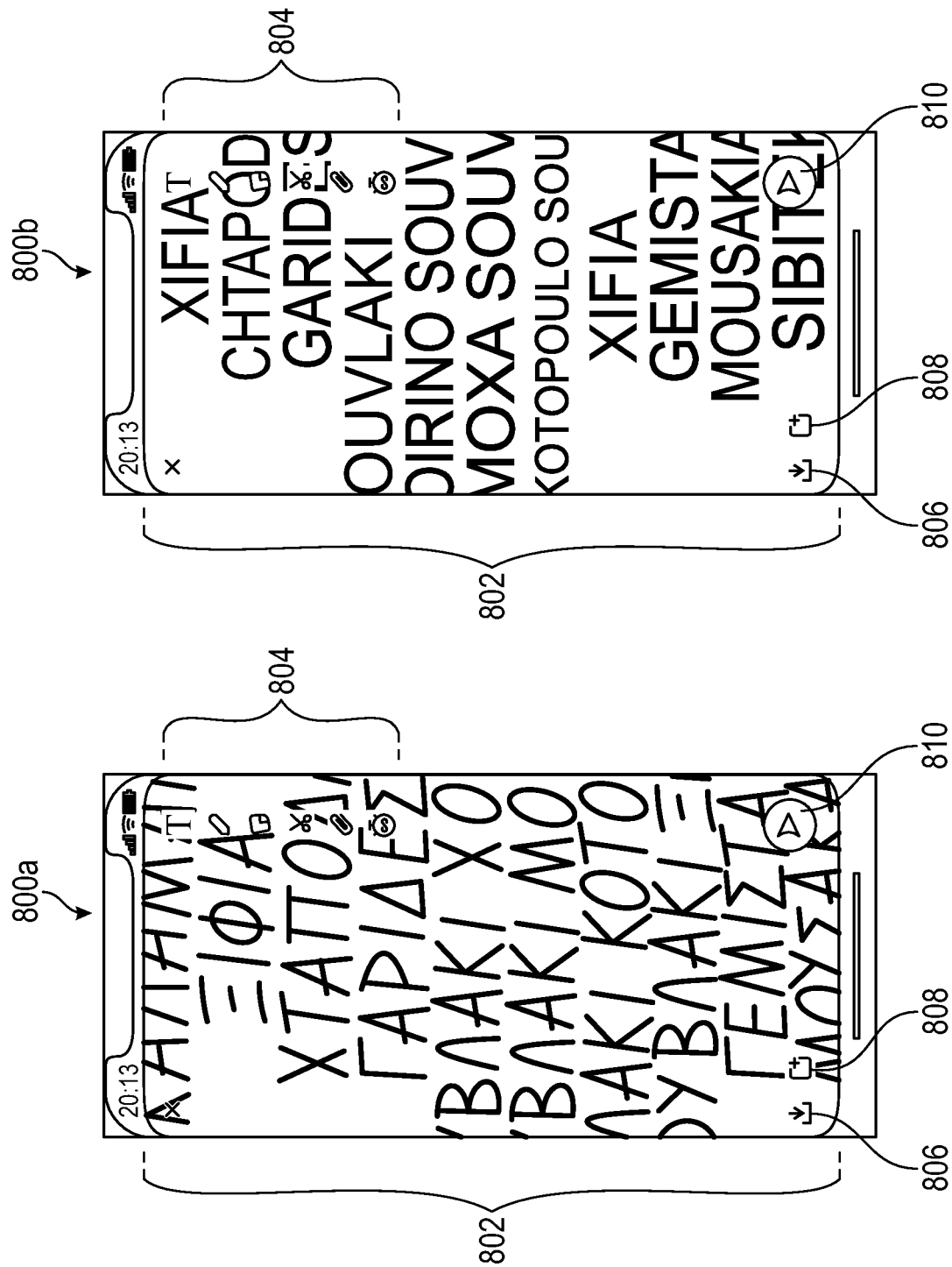
FIG. 8A illustrates an example user interface in which a user requests to display augmented reality corresponding to a translation in association with travel, in accordance with some example embodiments.
FIG. 8B illustrates an example user interface for displaying augmented reality corresponding to a translation in association with travel, in accordance with some example embodiments.

FIG. 8A illustrates an example user interface 800a in which a user requests to display augmented reality corresponding to a translation in association with travel, in accordance with some example embodiments. The user interface 800a includes a post capture image 802, editing tools 804, a save button 806, a story button 808 and a send button 810.

In the example of FIG. 8A, the user interface 800a corresponds to a message preview which includes media content (e.g., a post capture image 802) corresponding to an image previously captured by a camera of the client device 102. For example, the post capture image 802 may correspond to a photo/video (e.g., stored in RAM) that is displayed immediately after taking a photo (e.g., upon release of a shutter button). In another example, the post capture image 802 corresponds to an image selected from a local photo library of the client device 102, and/or an from a photo library associated with a user account of the messaging system 100.

A user of the client device 102 provides user input within the messaging client 104, to perform a scan operation to identify objects in the post capture image 802. In one or more embodiments, the user input to perform the scan operation may correspond to one or more of a swipe gesture (e.g., a right-to-left swipe) while the post capture image 802 is displayed. Alternatively or in addition, the user input may correspond to a tilt gesture while the post capture image 802 is displayed. As shown in FIG. 8A, the post capture image 802 depicts text in a first language (e.g., text from a post-capture photo of a magazine, other publication, mural, other piece of art, landmark, etc.).

In response to receiving the user input, the messaging client 104 (e.g., in conjunction with the object detection system 212) is configured to detect objects in the post capture image 802, and to determine attribute(s) of the detected objects. In the example of FIG. 8A, the object detection system 212 determines an attribute corresponding to a machine-encoded version of the text depicted in the post capture image 802. In addition, the object detection system 212 may be configured to determine a language associated with the machine-encoded version of the text (e.g., based on a query to the translation system 214, geolocation data stored in association with the post capture image 802, and/or other parameters).

In addition, the messaging client 104 determines travel parameters associated with the user input (e.g., one or more of a language, travel schedule, a transportation schedule, a general location, a specific venue or landmark, an activity, a list of participants, or a topic of interest). In one or more embodiments, the messaging client 104 determines that the attribute(s) of the machine-encoded text (e.g., and/or language) correspond with one or more of the travel parameters (e.g., language, general location). In response, the messaging client 104 may determine to perform a translation of the machine-encoded text from the first language (e.g., associated with the post capture image 802) to a second language (e.g., a primary language associated with the user's profile), and to request the translation system 214 to perform such translation as discussed with respect to FIG. 8B below.

In one or more embodiments, the user interface 800a includes editing tools 804 for modifying/annotating (e.g., drawing on, adding text to, adding stickers to, cropping, and the like) the post capture image 802. In addition, the user interface 800a includes a save button 806 for saving the post capture image 802 with any annotations, such as the augmented reality content as described herein. For example, user selection of the save button 806 may provide for saving the post capture image 802 with annotation(s) as a user memory, as discussed above. The user interface 800a further includes a story button 808 for creating a Story based on the post capture image 802 with annotation(s), and a send button 810 for sending a message including the post capture image 802 with annotation(s) to a recipient (e.g., contact/friend).

FIG. 8B illustrates an example user interface for displaying augmented reality corresponding to a translation in association with travel, in accordance with some example embodiments. The user interface 800b depicts the post capture image 802, the editing tools 804, the save button 806, the story button 808 and the send button 810 of FIG. 8A.

In the example of FIG. 8B, the user interface 800b illustrates the translation, for example, as generated by the translation system 214. As noted above with respect to FIG. 8B, the translation system 214 may have performed such translation based on a request (e.g., based on a swipe gesture or a tilt gesture by the user) from the messaging client 104, and provided the translation to the messaging client 104. The messaging client 104 may provide an animation in association with the swipe gesture (e.g., where the translation is gradually presented from a right-to-left direction, in synchronization with the user's right-to-left swipe).

In one or more embodiments, the generated translation is presented as an overlay with respect to the post capture image 802. Alternatively or in addition, the generated translation is presented so as to replace the depicted text, and to be formatted in a manner which is consistent with the depicted text.

Figure 9:
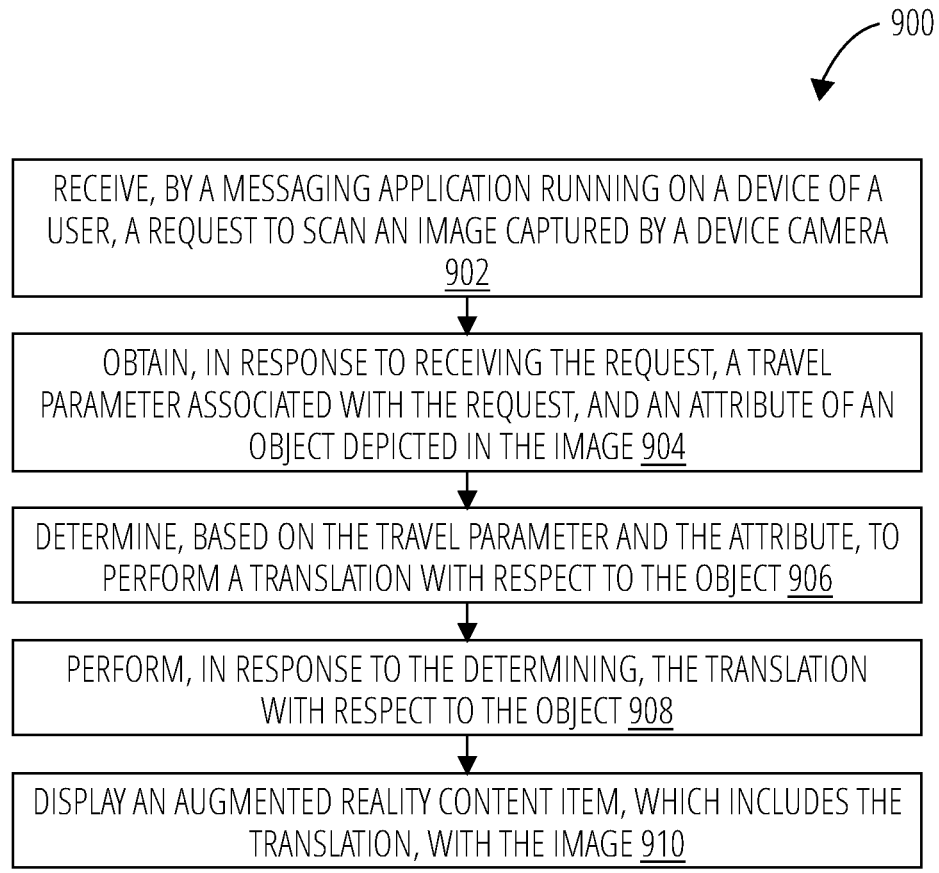
FIG. 9 is a flowchart illustrating a process for providing augmented reality content corresponding to a translation in association with travel, in accordance with some example embodiments.

FIG. 9 is a flowchart illustrating a process 900 for providing augmented reality content corresponding to a translation in association with travel, in accordance with some example embodiments. For explanatory purposes, the process 900 is primarily described herein with reference to the messaging client 104 of FIG. 1, and the object detection system 212 and the translation system 214 of FIG. 2. However, one or more blocks (or operations) of the process 900 may be performed by one or more other components, and/or by other suitable devices. Further for explanatory purposes, the blocks (or operations) of the process 900 are described herein as occurring in serial, or linearly. However, multiple blocks (or operations) of the process 900 may occur in parallel or concurrently. In addition, the blocks (or operations) of the process 900 need not be performed in the order shown and/or one or more blocks (or operations) of the process 900 need not be performed and/or can be replaced by other operations. The process 900 may be terminated when its operations are completed. In addition, the process 900 may correspond to a method, a procedure, an algorithm, etc.

The messaging client 104 receives a request to scan an image captured by a device camera (block 902). The image may correspond to a live feed of a camera of the device. Alternatively or in addition, the image may correspond to a saved image included in a photo library associated with the user.

The request may correspond to user selection of an interface element for performing the scan. Alternatively or in addition, the request may correspond to a press-and-hold gesture performed within a predefined portion of a screen of the device.

The messaging client 104 obtains, in response to receiving the request, a travel parameter associated with the request, and an attribute of an object depicted in the image (block 904). The travel parameter may indicate at least one of a travel schedule, a transportation schedule, a language, a general location, a specific venue or landmark, an activity, a list of participants, or a topic of interest associated with travel by the user.

The attribute may include comprises a name of the object, and the translation may be performed with respect to the name of the object. Alternatively or in addition, the attribute may include machine-encoded text based on text depicted within the image, and the translation may be performed with respect to the machine-encoded text. The attribute may be obtained in conjunction with the object detection system 212.

The messaging client 104 determines, based on the travel parameter and the attribute, to perform a translation with respect to the object (block 906). Determining to perform the translation may be further based on a geolocation of the device.

The messaging client 104 performs, in response to the determining, the translation with respect to the object (block 908). The translation may be performed in conjunction with the translation system 214.

The messaging client 104 displays an augmented reality content item, which includes the translation, with the image (block 910). The messaging client 104 may receive, during display of the translation, user input corresponding to a tilt gesture of the device, and perform, in response to receiving the user input, a second translation with respect to the object.

The messaging client 104 may select, from among plural augmented reality content items, the augmented reality content item based on the attribute and the travel parameter, and activate the selected augmented reality content item prior to the displaying. Alternatively or in addition, the augmented reality content item may be selected prior to receiving the request.

Figure 10:
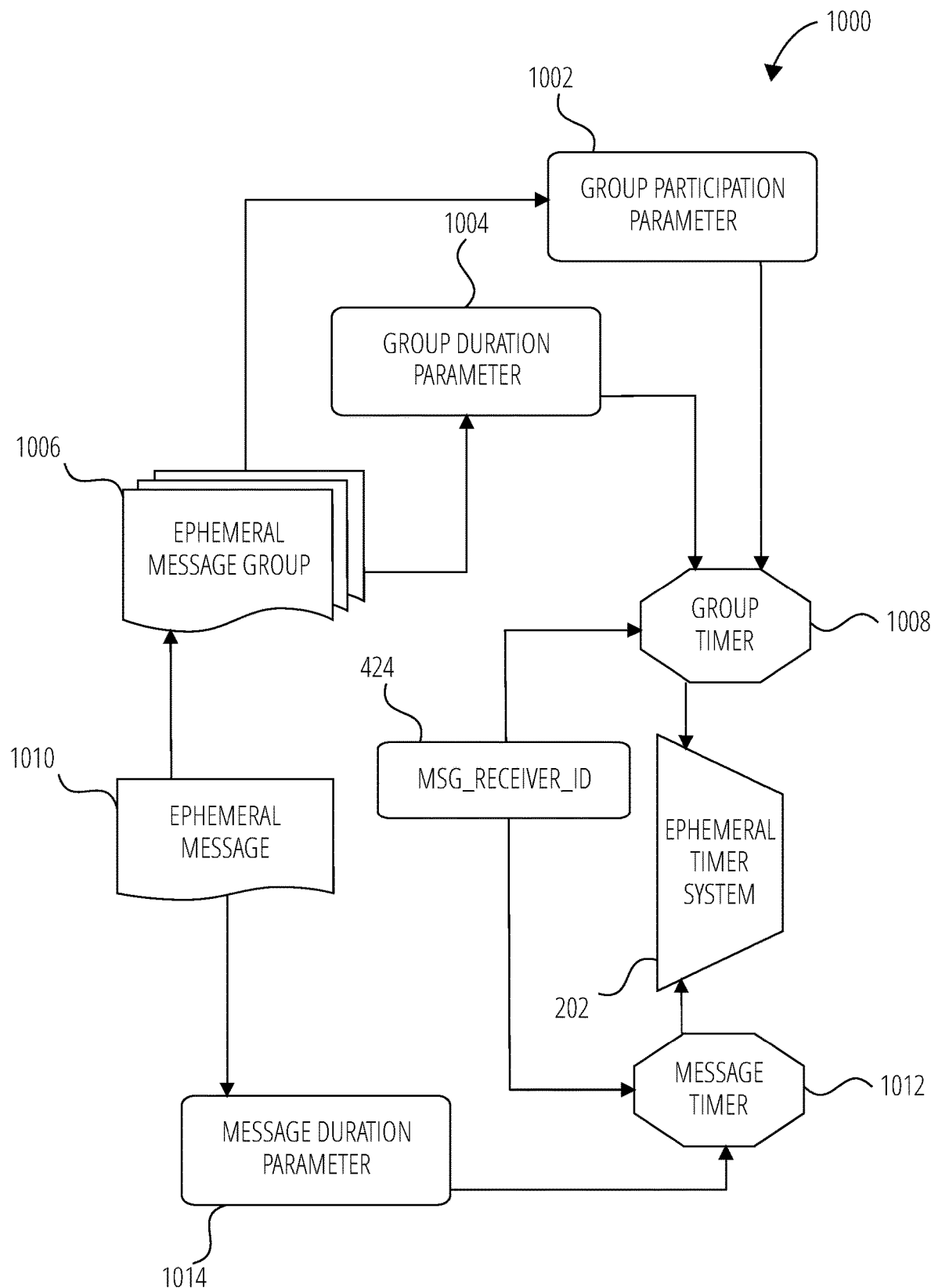
FIG. 10 is a flowchart for an access-limiting process, in accordance with some example embodiments.

FIG. 10 is a schematic diagram illustrating an access-limiting process 1000, in terms of which access to content (e.g., an ephemeral message 1010, and associated multimedia payload of data) or a content collection (e.g., an ephemeral message group 1006) may be time-limited (e.g., made ephemeral).

An ephemeral message 1010 is shown to be associated with a message duration parameter 1014, the value of which determines an amount of time that the ephemeral message 1010 will be displayed to a receiving user of the ephemeral message 1010 by the messaging client 104. In one example, an ephemeral message 1010 is viewable by a receiving user for up to a maximum of 10 seconds, depending on the amount of time that the sending user specifies using the message duration parameter 1014.

The message duration parameter 1014 and the message receiver identifier 424 are shown to be inputs to a message timer 1012, which is responsible for determining the amount of time that the ephemeral message 1010 is shown to a particular receiving user identified by the message receiver identifier 424. In particular, the ephemeral message 1010 will only be shown to the relevant receiving user for a time period determined by the value of the message duration parameter 1014. The message timer 1012 is shown to provide output to a more generalized ephemeral timer system 202, which is responsible for the overall timing of display of content (e.g., an ephemeral message 1010) to a receiving user.

The ephemeral message 1010 is shown in FIG. 10 to be included within an ephemeral message group 1006 (e.g., a collection of messages in a personal Story, or an event Story). The ephemeral message group 1006 has an associated group duration parameter 1004, a value of which determines a time duration for which the ephemeral message group 1006 is presented and accessible to users of the messaging system 100. The group duration parameter 1004, for example, may be the duration of a music concert, where the ephemeral message group 1006 is a collection of content pertaining to that concert. Alternatively, a user (either the owning user or a curator user) may specify the value for the group duration parameter 1004 when performing the setup and creation of the ephemeral message group 1006.

Additionally, each ephemeral message 1010 within the ephemeral message group 1006 has an associated group participation parameter 1002, a value of which determines the duration of time for which the ephemeral message 1010 will be accessible within the context of the ephemeral message group 1006. Accordingly, a particular ephemeral message group 1006 may "expire" and become inaccessible within the context of the ephemeral message group 1006, prior to the ephemeral message group 1006 itself expiring in terms of the group duration parameter 1004. The group duration parameter 1004, group participation parameter 1002, and message receiver identifier 424 each provide input to a group timer 1008, which operationally determines, firstly, whether a particular ephemeral message 1010 of the ephemeral message group 1006 will be displayed to a particular receiving user and, if so, for how long. Note that the ephemeral message group 1006 is also aware of the identity of the particular receiving user as a result of the message receiver identifier 424.

Accordingly, the group timer 1008 operationally controls the overall lifespan of an associated ephemeral message group 1006, as well as an individual ephemeral message 1010 included in the ephemeral message group 1006. In one example, each and every ephemeral message 1010 within the ephemeral message group 1006 remains viewable and accessible for a time period specified by the group duration parameter 1004. In a further example, a certain ephemeral message 1010 may expire, within the context of ephemeral message group 1006, based on a group participation parameter 1002. Note that a message duration parameter 1014 may still determine the duration of time for which a particular ephemeral message 1010 is displayed to a receiving user, even within the context of the ephemeral message group 1006. Accordingly, the message duration parameter 1014 determines the duration of time that a particular ephemeral message 1010 is displayed to a receiving user, regardless of whether the receiving user is viewing that ephemeral message 1010 inside or outside the context of an ephemeral message group 1006.

The ephemeral timer system 202 may furthermore operationally remove a particular ephemeral message 1010 from the ephemeral message group 1006 based on a determination that it has exceeded an associated group participation parameter 1002. For example, when a sending user has established a group participation parameter 1002 of 24 hours from posting, the ephemeral timer system 202 will remove the relevant ephemeral message 1010 from the ephemeral message group 1006 after the specified 24 hours. The ephemeral timer system 202 also operates to remove an ephemeral message group 1006 when either the group participation parameter 1002 for each and every ephemeral message 1010 within the ephemeral message group 1006 has expired, or when the ephemeral message group 1006 itself has expired in terms of the group duration parameter 1004.

In certain use cases, a creator of a particular ephemeral message group 1006 may specify an indefinite group duration parameter 1004. In this case, the expiration of the group participation parameter 1002 for the last remaining ephemeral message 1010 within the ephemeral message group 1006 will determine when the ephemeral message group 1006 itself expires. In this case, a new ephemeral message 1010, added to the ephemeral message group 1006, with a new group participation parameter 1002, effectively extends the life of an ephemeral message group 1006 to equal the value of the group participation parameter 1002.

Responsive to the ephemeral timer system 202 determining that an ephemeral message group 1006 has expired (e.g., is no longer accessible), the ephemeral timer system 202 communicates with the messaging system 100 (and, for example, specifically the messaging client 104) to cause an indicium (e.g., an icon) associated with the relevant ephemeral message group 1006 to no longer be displayed within a user interface of the messaging client 104. Similarly, when the ephemeral timer system 202 determines that the message duration parameter 1014 for a particular ephemeral message 1010 has expired, the ephemeral timer system 202 causes the messaging client 104 to no longer display an indicium (e.g., an icon or textual identification) associated with the ephemeral message 1010.

Figure 11:
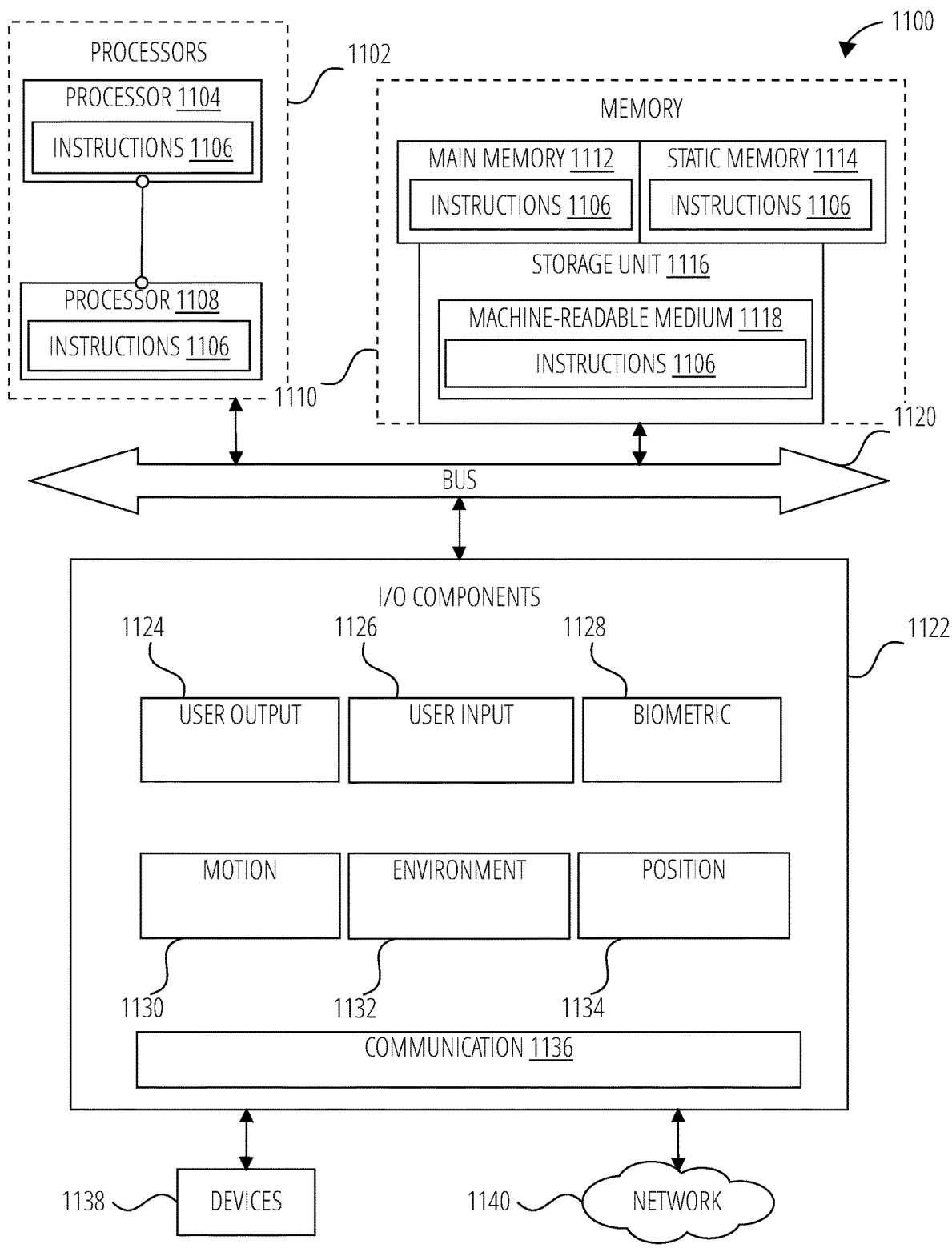
FIG. 11 is a diagrammatic representation of a machine in the form of a computer system within which a set of instructions may be executed for causing the machine to perform any one or more of the methodologies discussed herein, in accordance with some example embodiments.

FIG. 11 is a diagrammatic representation of the machine 1100 within which instructions 1106 (e.g., software, a program, an application, an applet, an app, or other executable code) for causing the machine 1100 to perform any one or more of the methodologies discussed herein may be executed. For example, the instructions 1106 may cause the machine 1100 to execute any one or more of the methods described herein. The instructions 1106 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1106, sequentially or otherwise, that specify actions to be taken by the machine 1100. Further, while only a single machine 1100 is illustrated, the term "machine" shall also be taken to include a collection of machines that individually or jointly execute the instructions 1106 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1110, and input/output I/O components 1122, which may be configured to communicate with each other via a bus 1120. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1104 and a processor 1108 that execute the instructions 1106. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1110 includes a main memory 1112, a static memory 1114, and a storage unit 1116, both accessible to the processors 1102 via the bus 1120. The main memory 1110, the static memory 1114, and storage unit 1116 store the instructions 1106 embodying any one or more of the methodologies or functions described herein. The instructions 1106 may also reside, completely or partially, within the main memory 1112, within the static memory 1114, within machine-readable medium 1118 within the storage unit 1116, within at least one of the processors 1102 (e.g., within the Processor's cache memory), or any suitable combination thereof, during execution thereof by the machine 1100.

The I/O components 1122 may include a wide variety of components to receive input, provide output, produce output, transmit information, exchange information, capture measurements, and so on. The specific I/O components 1122 that are included in a particular machine will depend on the type of machine. For example, portable machines such as mobile phones may include a touch input device or other such input mechanisms, while a headless server machine will likely not include such a touch input device. It will be appreciated that the I/O components 1122 may include many other components that are not shown in FIG. 11. In various examples, the I/O components 1122 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1122 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1122 further include communication components 1136 operable to couple the machine 1100 to a network 1140 or devices 1138 via respective coupling or connections. For example, the communication components 1136 may include a network interface Component or another suitable device to interface with the network 1140. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1138 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1106), when executed by processors 1102, cause various operations to implement the disclosed examples.

The instructions 1106 may be transmitted or received over the network 1140, using a transmission medium, via a network interface device (e.g., a network interface component included in the communication components 1136) and using any one of several well-known transfer protocols (e.g., hypertext transfer protocol (HTTP)). Similarly, the instructions 1106 may be transmitted or received using a transmission medium via a coupling (e.g., a peer-to-peer coupling) to the devices 1138.

Figure 12:
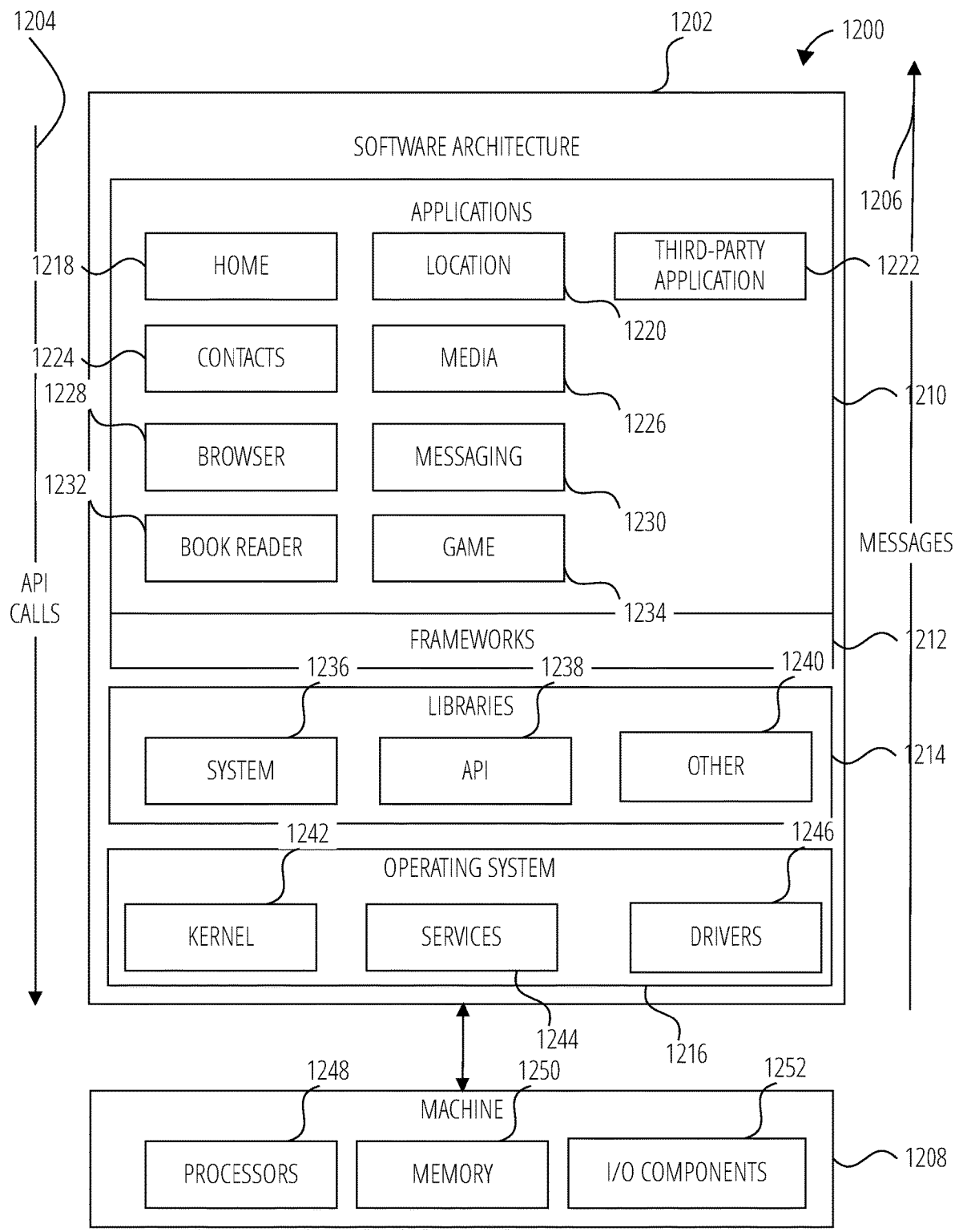
FIG. 12 is a block diagram showing a software architecture within which examples may be implemented, in accordance with some example embodiments.

FIG. 12 is a block diagram 1200 illustrating a software architecture 1202, which can be installed on any one or more of the devices described herein. The software architecture 1202 is supported by hardware such as a machine 1208 that includes processors 1248, memory 1250, and I/O components 1252. In this example, the software architecture 1202 can be conceptualized as a stack of layers, where each layer provides a particular functionality. The software architecture 1202 includes layers such as an operating system 1216, libraries 1214, frameworks 1212, and applications 1210. Operationally, the applications 1210 invoke API calls 1204 through the software stack and receive messages 1206 in response to the API calls 1204.

The operating system 1216 manages hardware resources and provides common services. The operating system 1216 includes, for example, a kernel 1242, services 1244, and drivers 1246. The kernel 1242 acts as an abstraction layer between the hardware and the other software layers. For example, the kernel 1242 provides memory management, processor management (e.g., scheduling), component management, networking, and security settings, among other functionality. The services 1244 can provide other common services for the other software layers. The drivers 1246 are responsible for controlling or interfacing with the underlying hardware. For instance, the drivers 1246 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1210. The libraries 1214 can include system libraries 1236 (e.g., C standard library) that provide functions such as memory allocation functions, string manipulation functions, mathematic functions, and the like. In addition, the libraries 1214 can include API libraries 1238 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1240 to provide many other APIs to the applications 1210.

The frameworks 1212 provide a common high-level infrastructure that is used by the applications 1210. For example, the frameworks 1212 provide various graphical user interface (GUI) functions, high-level resource management, and high-level location services. The frameworks 1212 can provide a broad spectrum of other APIs that can be used by the applications 1210, some of which may be specific to a particular operating system or platform.

In an example, the applications 1210 may include a home application 1218, a contacts application 1224, a browser application 1228, a book reader application 1232, a location application 1220, a media application 1226, a messaging application 1230, a game application 1234, and a broad assortment of other applications such as a third-party application 1222. The applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third-party application 1222 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1222 can invoke the API calls 1204 provided by the operating system 1216 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
receiving, by a messaging application running on a device of a user, a request to scan an image captured by a device camera;
obtaining, in response to receiving the request, a travel parameter associated with the request, and an attribute of an object depicted in the image;
determining, based on the travel parameter and the attribute, to perform a translation with respect to the object;
performing, in response to the determining, the translation with respect to the object;
selecting, from among plural augmented reality content items, an augmented reality content item based on the attribute and the travel parameter;
activating the selected augmented reality content item; and
displaying the augmented reality content item, which includes the translation, with the image.

2. The method of claim 1, wherein the travel parameter indicates at least one of a travel schedule, a transportation schedule, a language, a general location, a specific venue or landmark, an activity, a list of participants, or a topic of interest associated with travel by the user.

3. A method, comprising:
receiving, by a messaging application running on a device of a user, a request to scan an image captured by a device camera;
obtaining, in response to receiving the request, a travel parameter associated with the request, and an attribute of an object depicted in the image;
determining, based on the travel parameter and the attribute, to perform a translation with respect to the object;
performing, in response to the determining, the translation with respect to the object;
selecting, from among plural augmented reality content items, an augmented reality content item based on the attribute and the travel parameter;
activating the selected augmented reality content item; and
displaying aa the augmented reality content item, which includes the translation, with the image.

4. The method of claim 1, wherein the attribute comprises machine-encoded text based on text depicted within the image, and
wherein the translation is performed with respect to the machine-encoded text.

5. The method of claim 1, further comprising:
receiving, during display of the translation, user input corresponding to a tilt gesture of the device; and
performing, in response to receiving the user input, a second translation with respect to the object.

6. The method of claim 1, wherein determining to perform the translation is further based on a geolocation of the device.

7. The method of claim 1, wherein the augmented reality content item is selected prior to receiving the request.

8. The method of claim 1, wherein the request corresponds to user selection of an interface element for performing the scan.

9. The method of claim 1, wherein the request corresponds to a press-and-hold gesture performed within a predefined portion of a screen of the device.

10. The method of claim 1, wherein the image corresponds to a live feed of a camera of the device.

11. The method of claim 1, wherein the image corresponds to a saved image included in a photo library associated with the user.

12. A device, comprising:
a processor; and
a memory storing instructions that, when executed by the processor, configure the processor to:
receive, by a messaging application, a request to scan an image captured by a device camera;
obtain, in response to receiving the request, a travel parameter associated with the request, and an attribute of an object depicted in the image;
determine, based on the travel parameter and the attribute, to perform a translation with respect to the object;
perform, in response to the determining, the translation with respect to the object;
select, from among plural augmented reality content items, an augmented reality content item based on the attribute and the travel parameter;
activate the selected augmented reality content item; and
display an the augmented reality content item, which includes the translation, with the image.

13. The device of claim 12, wherein the travel parameter indicates at least one of a travel schedule, a transportation schedule, a language, a general location, a specific venue or landmark, an activity, a list of participants, or a topic of interest associated with travel by a user.

14. The device of claim 12, wherein the attribute comprises a name of the object, and
wherein the translation is performed with respect to the name of the object.

15. The device of claim 12, wherein the attribute comprises machine-encoded text based on text depicted within the image, and
wherein the translation is performed with respect to the machine-encoded text.

16. The device of claim 12, wherein the instructions further configure the processor to:
receive, during display of the translation, user input corresponding to a tilt gesture of the device; and perform, in response to receiving the user input, a second translation with respect to the object.

17. The device of claim 12, wherein determining to perform the translation is further based on a geolocation of the device.

18. A non-transitory computer-readable storage medium, the computer-readable storage medium including instructions that when executed by a computer, cause the computer to:
- receive, by a messaging application running on a device of a user, a request to scan an image captured by a device camera;
- obtain, in response to receiving the request, a travel parameter associated with the request, and an attribute of an object depicted in the image;
- determine, based on the travel parameter and the attribute, to perform a translation with respect to the object;
- perform, in response to the determining, the translation with respect to the object;
- select, from among plural augmented reality content items, an augmented reality content item based on the attribute and the travel parameter;
- activate the selected augmented reality content item; and
- display an the augmented reality content item, which includes the translation, with the image.

* * * * *